Figure 1:
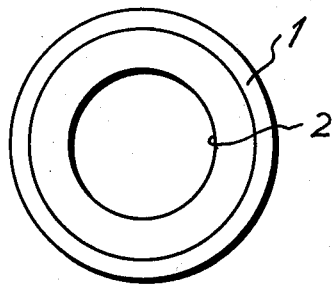

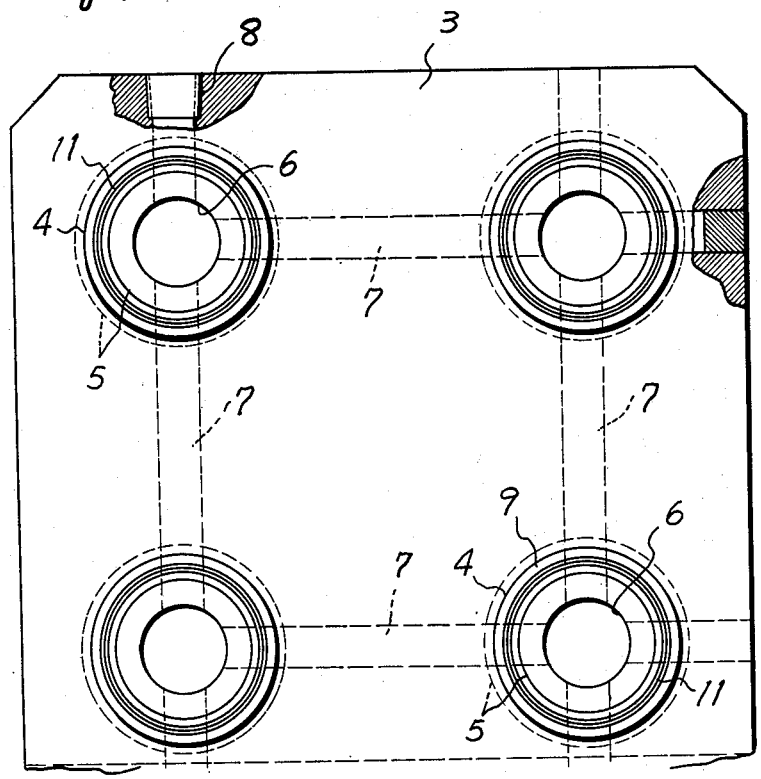
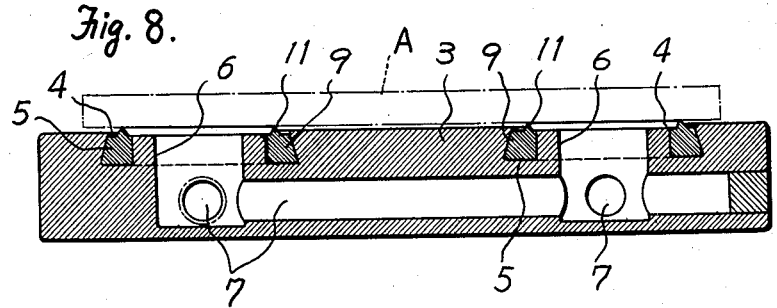

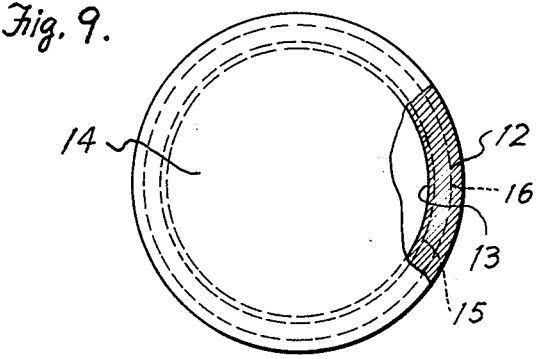
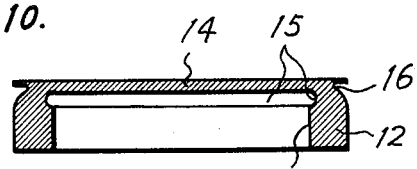
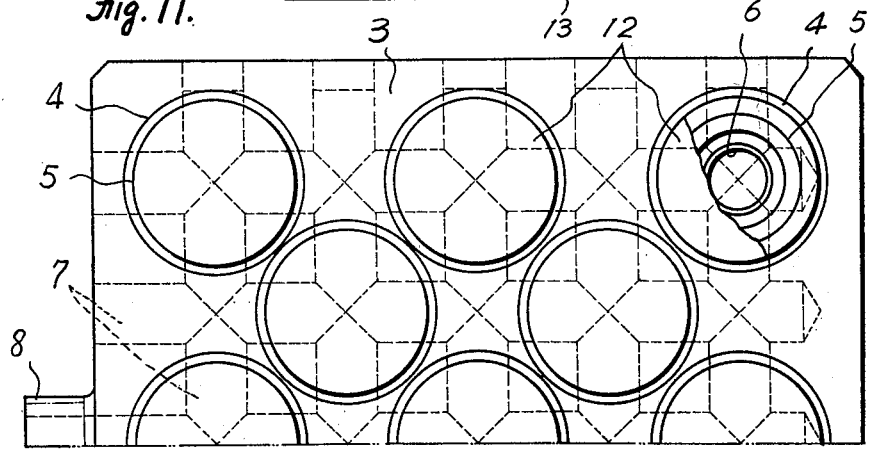
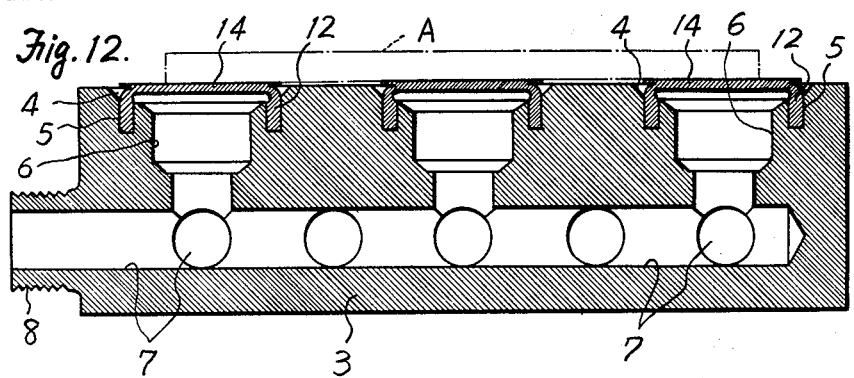

Nov. 24, 1964 SHINJIRO YAMAMURA 3,158,381
VACUUM CHUCK
Filed Oct. 11, 1962 7 Sheets-Sheet 5

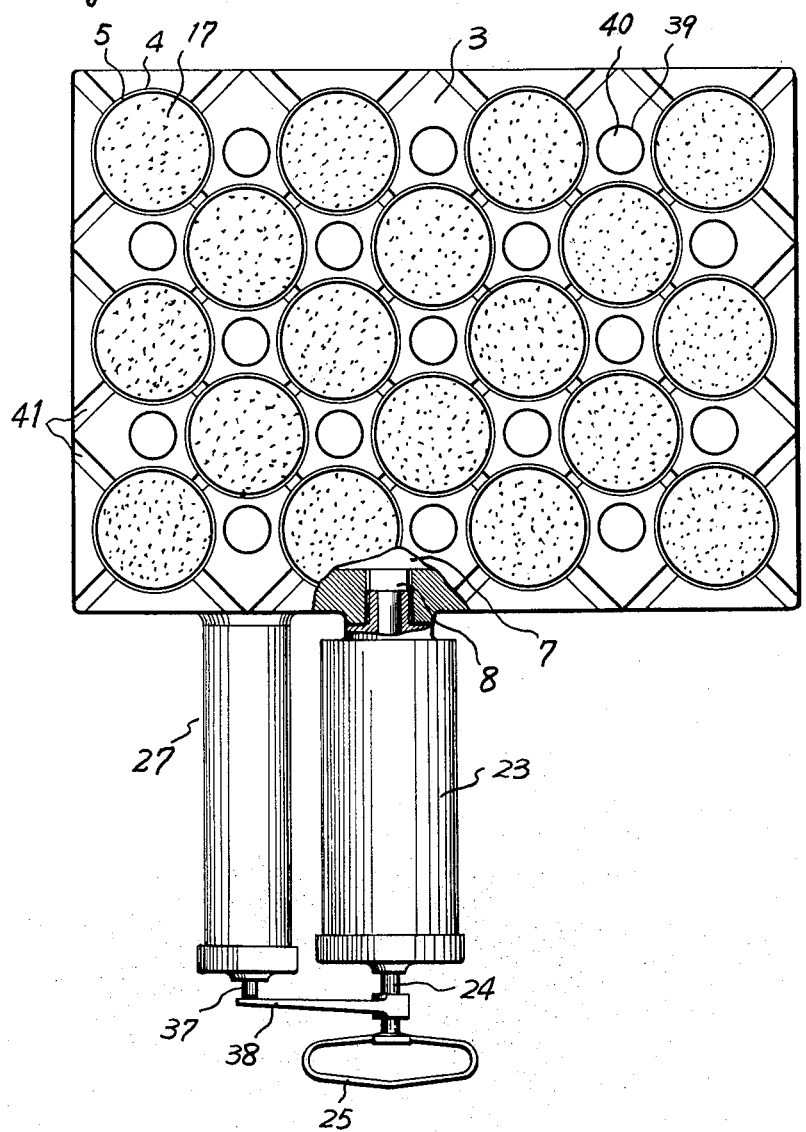

United States Patent Office 3,158,381
Patented Nov. 24, 1964

3,158,381
VACUUM CHUCK
Shinjiro Yamamura, Amagasaki, Japan, assignor to Kabushiki Kaisha Amagasaki Kosakusho, Amagasaki, Japan
Filed Oct. 11, 1962, Ser. No. 229,909
Claims priority, application Japan, Mar. 5, 1962, 37/8,859, 37/8,860; Apr. 2, 1962, 37/13,294, 37/13,295
4 Claims. (Cl. 279—3)

The present invention relates to a vacuum chuck for the object of rendering adhesive and fixable work-pieces to be worked, for instance, by machining, grinding and other machining operations.

Hitherto, vacuum chucks of the type referred to above are usually bag-shaped or V-shaped, which merely render objects adhesive and capable of being hung but unable of machining and grinding. Moreover, in the machining and grinding of work pieces through electro-magnetic chucks, it has been inevitably necessary that the work pieces be of magnetic material. Furthermore, since an annular body is opened centrally to the chuck proper and as a through hole is communicated with a suction passage, such passage will not be a vacuum resulting in the incapability of workpieces becoming adhesive because the interior of the suction passage cannot be evacuated due to air streaming into its interior from the through hole; also, the entire sections of the chuck are not covered to prevent air from flowing therein, as when the work-pieces or hanging pieces subjecting to machining or grinding are small or have punched portions.

A vacuum chuck according to this invention is characterized in that an annular relief strip with an angle-shaped top is provided on the upper end face of an elastic, airtight, annular body of rubber, synthetic resin or the like capable of having a circular, rectangular, elliptical or other sectional form whereby work-pieces are firmly adhered and fixed to the chuck proper to perform machining and grinding.

A vacuum chuck according to another embodiment of this invention is characterized in that an annular relief strip with an angle-shaped top is provided on the upper end face of an airtight, elastic, annular body made of rubber, synthetic resin or the like to form airtight rings which are sealingly inserted into several annular grooves formed in several places on the surface of the chuck proper; each of said annular grooves is provided with a perforation opened upwardly at the center to define a through hole communicating with a suction passage. The chuck proper referred to above may be rectangular or circular shape according to the nature of application, and fixed to a stand which may be inclined, rotated or moved reciprocally, and thereafter the suction passage is connected to a vacuum pump. The elastic annular body may be formed in the rectangular, circular or elliptical form of section. As a result, work pieces may be machined or ground after the work pieces having been adhered by suction according to this invention. As a vacuum adhesion is used in fixing work pieces according to this invention, work pieces of all sorts of material may be fixed for cutting and grinding, irrespective whether they are magnetic or non-magnetic. Moreover, as the annular elastic body is air-tight and elastic, the vacuum efficiency is high. In consequence, the rotating-machining may be performed, when the chuck proper is secured on a rotating frame and also the reciprocating-machining may be performed on a reciprocating sliding bed.

Furthermore, according to another embodiment of this invention, with an object of machining and grinding workpieces smaller than the chuck proper or including one or more punched portions after fixed by adhesion, one or a plurality of thin suckers are characteristically formed on the upper portion of a sucker body of rubber, synthetic resin or the like, which in turn is airtight and elastic. On the elastic sucker body is arranged an annular relief peripheral edge incorporated with the sucker and having a longitudinal section of a circle, rectangle, ellipse or the like; the relief edge is formed with an inner and outer annular recesses on the inner end-portion. Therefore, the work-piece is adhered airtight with a sucker in accordance with the present invention. The contact can be retained airtight even with the surface of work-pieces being more or less uneven because the venting of a contact surface between the sucker periphery and work-piece is perfectly shut off and the work-piece is firmly fixed by adhesion to the chuck proper. The perforations (or vents) which are not shut off with the work-piece, are shut off by the elastic sucker body, even when the workpieces are small or there are punched portions, the vacuum of the suction passage will be retained, and each of all elastic sucker bodies can conduct adhesive action separately.

According to a further embodiment of this invention, for accomplishing an object similar as that referred to in the preceding paragraphs, rubber or synthetic resin elastic sucker bodies of inverted U-shaped section, provided with thin suckers on the top, are inserted airtight characteristically in annular grooves provided at several places of the surface of the chuck proper, with passages in the chuck proper communicating with the elastic sucker bodies. The elastic sucker bodies are provided with annular relief peripheral bodies of a cross sectional form, such as a circular, rectangular, elliptical or the like form, engraved around each sucker, said relief periphery being formed with inner and outer annular recesses on the inside end portion. Further, the chuck proper may be formed in a rectangular or circular form, depending on the use to which the chuck is directed, and mounted on an inclined rotating or reciprocatory sliding bed, thereby rendering the suction passage to communicate with a vacuum pump. Therefore, since the sucker bodies each conducts adhesion separately against respective work pieces, the vacuum inside of the suction passage will be maintained because vents of the chuck proper are covered with the elastic sucker body in airtightness to shut off the venting thereof, even when the work-piece is small or has punched portions, resulting in no part of said vents being closed. Thus, the work-piece can be fixed by adhesion and the elastic sucker bodies have sufficient airtightness and elasticity. In consequence, the vacuum efficiency is high, and a rotary machining can be effected with the chuck proper mounted on a rotary stand and also a reciprocatory type machining can be effected, when the chuck proper is secured on a sliding bed making reciprocating motion. Moreover, when hung articles or flaps are adhered and hung, the fixing by adhesion is enabled by securing one or several elastic sucker bodies to a holder and mounting such holders on the hanging frame.

A further embodiment of the present invention is characterized by the fact that airtight, elastic sucker bodies made of rubber or synthetic resin or the like are inserted airtight into annular grooves of the chuck board; vents opening to the center inside of said annular grooves communicated with a suction hole formed within said chuck lathe; then a liquid is charged in the vents and suction hole and simultaneously a suction opening of one side portion of the suction hole are communicated with a pump. Therefore, as the elastic sucker bodies of this invention is adapted each to perform adhesion separately, work-pieces which are small or include punched portions can be fixed by adhesion. The vacuum efficiency is high due to elastic sucker bodies having airtightness, and the force for flexing suckers by the suction of liquid is high and the machining and grinding can be performed in accordance with the rotary and reciprocatory types of machining by mounting the chuck board on either rotating or reciprocatory sliding bed. And further, this can be for hanging by securing the chuck lathe to a hanging frame.

Figure 2:
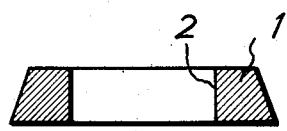
Figure 3:
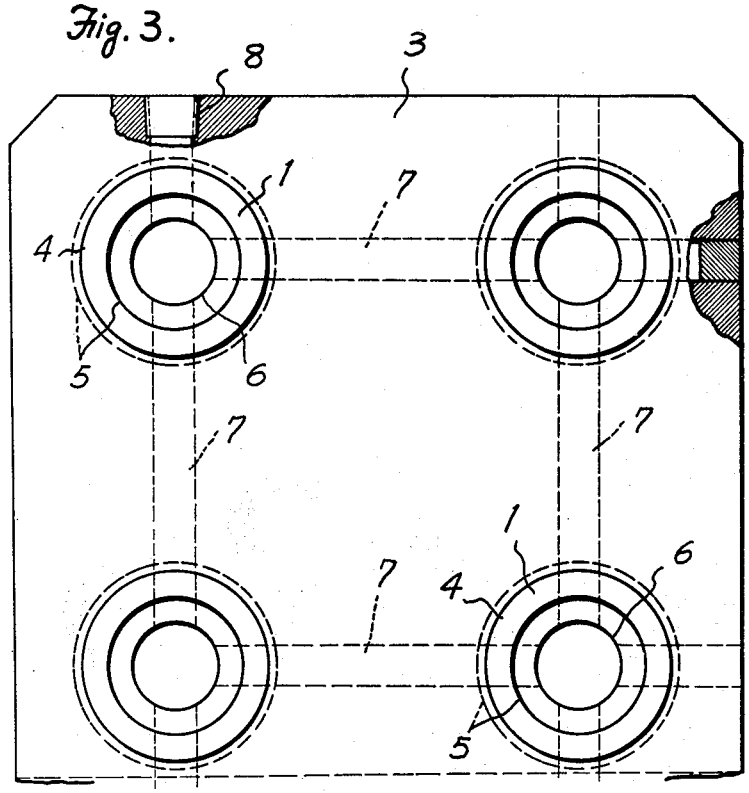
Figure 4:
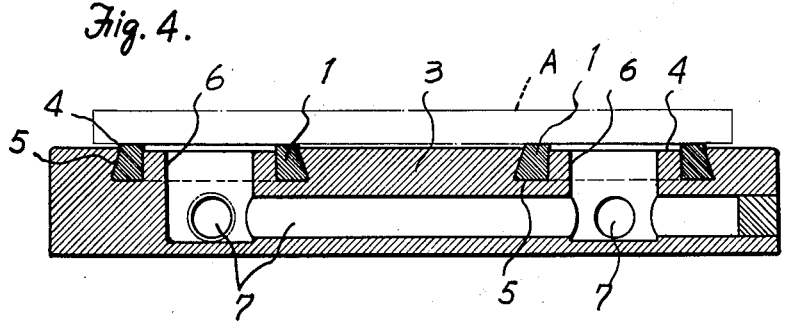
Figure 5:
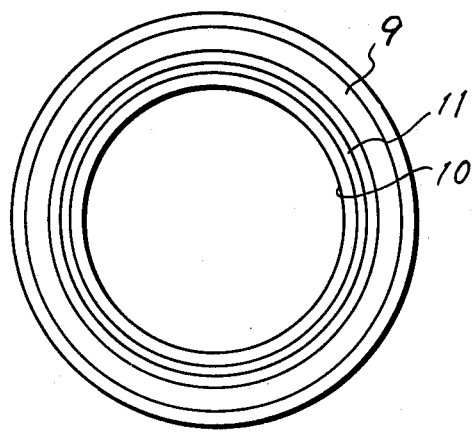
Figure 6:
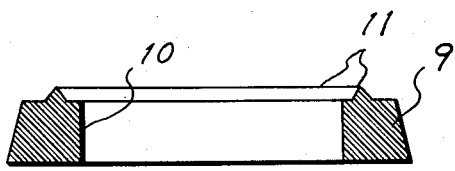
Figure 13:
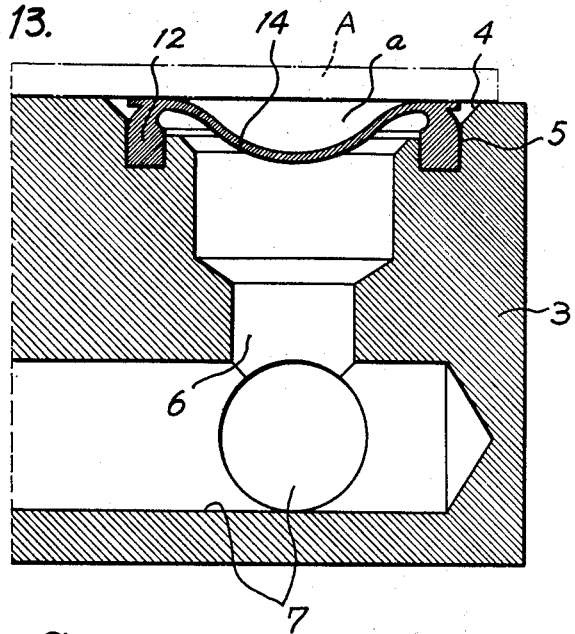
Figure 14:
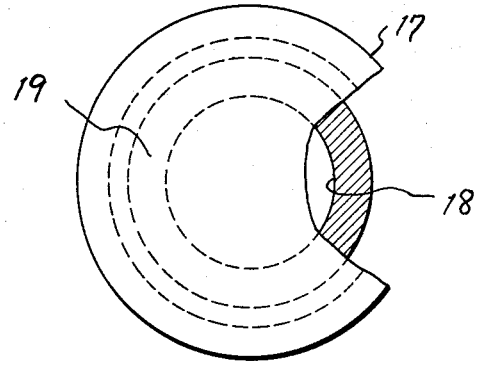
Figure 15:
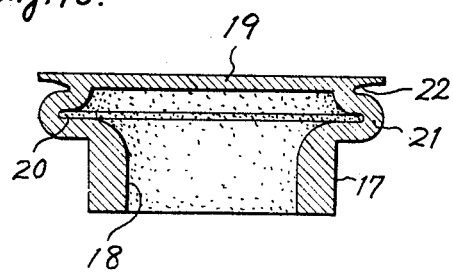
Figure 18:
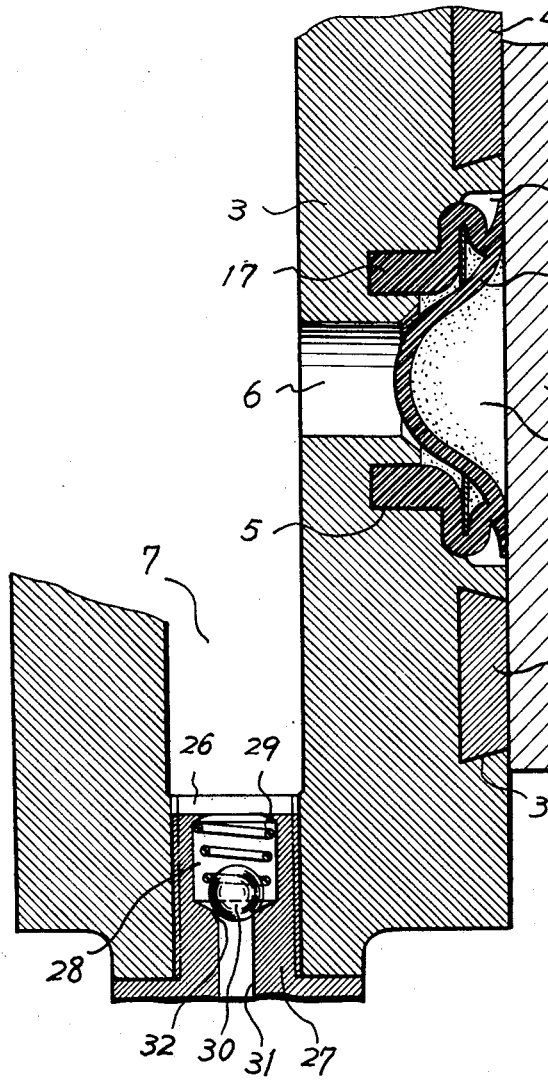
Figure 17:
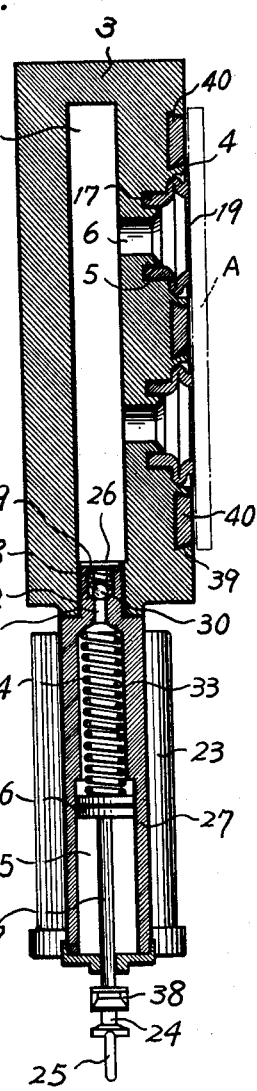

In the following, the present invention will be described in further detail in connection with several embodiments of this invention as illustrated in the accompanying drawings, in which:

FIG. 1 is a front view of an annular airtight body; FIG. 2 is a side view thereof showing same in longitudinal section; FIG. 3 is a front view of a chuck-board fitted with the annular airtight body, a part of said chuck-board being cut off; FIG. 4 is a side view of the chuck-board in longitudinal section; FIG. 5 is a front view of an annular airtight body having annular reliefs; FIG. 6 is a side view of the annular airtight body, in longitudinal section; FIG. 7 is a front view of the chuck-board provided with an annular airtight body having relief annular stripes, a part of said board being cut off; FIG. 8 is a side view of the chuck-board of FIG. 7 in longitudinal section; FIG. 9 is a front view with a part of the sucker body being cut off; FIG. 10 is a side view thereof showing in a longitudinal section; FIG. 11 is a front view of the chuck-board fitted with a chuck body having suckers, a part of said board being cut off; FIG. 12 is a side view of such a board in longitudinal section; FIG. 13 is a side view of the board, a part of which is shown in longitudinal section, illustrating the state of adhesion thereof; FIG. 14 is a front view of the sucker body, a part of which is taken off; FIG. 15 is a side view thereof in longitudinal section; FIG. 16 is a front view of the chuck-board provided with sucker bodies, a part of which is taken off; FIG. 17 is a side view of the board shown in longitudinal section; and FIG. 18 is a side view of the board in longitudinal section, showing the state of adhesion thereof.

The present invention has been described, by way of example, in reference to the accompanying drawings. However, numbers of modifications can, of course, be made possible by those skilled in the art, without departing from the scope and spirit of this invention as set forth in the appended claims.

Referring to the drawings, the present invention will be described in the following: FIGS. 1 through 4 represent annular airtight vacuum chucks. The airtight annular bodies 1 illustrated in FIGS. 1 and 2 are made from airtight elastic material, such as rubber and synthetic resin, each having a vacant space 2 at the center.

A chuck-board 3 illustrated in FIGS. 3 and 4 is provided with one or several annular recesses 4 on its surface, and in each of said annular recesses 4 is formed an annular groove 5. A vent 6 opening upwards at the center is formed inside of the annular groove 5 and is then communicated with a suction hole 7 inside of the chuck-board 3. A suction opening 8 communicates at one extremity of the suction hole 7 and communicates with a vacuum pump.

As illustrated in FIGS. 3 and 4, the annular airtight body 1 as shown FIG. 1 and FIG. 2 is inserted airtight in the annular groove 5, through the annular recess 4 of the chuck-board 3, with the upper end face of the annular airtight body 1 projected to some extent above the surface of the chuck-board 3.

In the use of said apparatus, a work-piece A is put on the annular airtight body 1, then the upper surface of the body 1 is brought into contact with the work-piece A; the venting of the contact face is shut off and the vacuum pump is started to discharge air from the suction opening 8 to maintain the vacuum condition at the vent 6 and suction hole 7, thereby adhering under vacuum the work-piece onto the upper face of the airtight annular body 1 and firmly fixing the work-piece to the chuck-board 3 to machine or grind.

FIGS. 5 to 8 represent an annular-airtight-body type vacuum chuck having relief ring stripes; and the airtight annular body 9 as illustrated in FIGS. 5 and 6 is an airtight, elastic body of rubber, synthetic resin or the like, provided with a vacant space at its center and simultaneously with an angularly topped, annular relief strip 11 protruded on the top end.

The annular airtight body 9 having a relief annular strip 11 as shown in FIGS. 5 and 6 is inserted airtight in the annular groove 5, through the annular recess 4 of the chuck-board 3, with the upper end of the relief strip slightly above the chuck-board 3.

In the use of said apparatus, a work-piece A is placed on the relief annular strip 11 of the annular airtight body 9, and the said upper surface of the annular relief body is brought in contact with the work-piece A in airtightness so that the venting of the contact surface is shut off and the air is then exhausted through the suction duct 8 to maintain the necessary condition of vacuum in the vent 6 and suction hole 7. Thereby, the work-piece A is adhered under vacuum to the upper surface of the relief annular strip 11 of the airtight annular body 9, thus firmly fixed b yadhesion to the chuck-board 3 for machining or other working.

The sucker type vacuum chucks are illustrated in FIGS. 9 through 13 and the sucker body 12 shown in FIGS. 9 and 10 is made of rubber, synthetic resin or other elastic material, in an annular form, with a vacuum space 13 provided at the center, and simultaneously with thin suckers 14 provided on the upper face, as well as inner or outer annular grooves 15, 16 on the lower face thereof.

The chuck-board 3 as illustrated in FIGS. 11 and 12 is formed with an annular recess 4, annular groove 5, vent 6, suction hole 7 and a suction duct 8, similarly as in that shown in FIGS. 3 and 4.

The sucker body 12 as shown in FIGS. 9 and 10 is inserted airtight in the annular groove 5 via the annular recess 4 of the chuck board 3, with the upper face of the sucker 14 slightly projected above the chuck-board.

In the use of the apparatus just referred to, the work-piece A is placed on the sucker 14 of the sucker body 12, with the upper face of the sucker 14 of the sucker body 12 being brought in contact airtight with the work-piece A, whereby the venting of the contact surface is shut off; then the vacuum pump is started to exhaust through the suction vent 8, so that the vent 8 and the suction conduit 7 may be kept in vacuum. As illustrated in FIG. 13, the venting is shut off by bringing the periphery of the sucker 14 in air tight contact with the work-piece A and the sucker 14 is inwardly flexed by adhesion under suction whereby a vacuum clearance (a) is formed in the contact portion between the sucker 14 and work-piece A. Thus, the work-piece A is firmly adhered under suction to the chuck-board 3, in order to effect machining and grinding.

The sucker type vacuum chuck is illustrated in FIGS. 14 through 18, and the sucker body 17 as illustrated in FIGS. 14 and 15, is formed in annular form of rubber, synthetic resin or other elastic and airtight material, with a vacant space 18 being provided at the center, and simultaneously with a thin sucker 19 being provided on the upper surface, and also with outer annular projection 21 having an inner annular groove 20 at the lower portion of this sucker 19 to constitute an annular recess 22 on the lower face of the sucker 19.

The chuck-board 3 shown in FIGS. 16 and 17 is provided with annular recesses 4, annular grooves 5, conduits 6, suction conduits 7 and suction ducts 8 which are communicated with a pump 23. A handle 25 is provided behind the actuating rod 24 for said pump 23; the conduits 6 and suction ducts 7 are then filled with liquid.

A liquid suction port 26 is provided adjacent to a suction duct 8 on one side portion of a suction duct 7 of the chuck-board 3 and is secured to the inside opening of a liquid suction device 27, has a valve chamber 28 in the inside opening thereof. A compression spring 29 in the valve chamber 28 biases a ball valve 30 into contact with a notched valve seat 32, a passage 31 which leads to a duct 33. A piston-compression spring 34 is inserted in duct 33 and in a cylinder hole 35 which communicates with the duct 33; a piston 36 is inserted in the cylinder hole 35 through which a piston rod 37 projects to the exterior thereof so that its outer end is brought adjacent to a release rod 38 secured to a pump actuating rod 24.

A number of recesses 39 are provided in the board 3 about the annular recesses, and a filler 40 of any suitable material having a high coefficient of friction is put in said recesses 39 and simultaneously discharge grooves 41 are provided in spaces between the annular recesses 4 and the spaces between the annular recesses 4 and the outside portions.

As shown in FIGS. 16 and 17, the sucker bodies 17 as shown in FIGS. 14 and 15 are inserted airtight in the annular recesses 5 with the upper face of the suckers 19 being projected slightly above the chuck-board 3, via the annular recesses 4 of the chuck-board 3.

In the use of this apparatus, a work-piece A is placed on the sucker 19 of the sucker body 17, and upper surface of the sucker 19 is brought in contact with the work-piece A airtight so that the venting of the contact surface may be shut off; then the liquid-suction pump 23 is actuated by pulling the handle 25; when the liquid in the conduits 6 and suction ducts 7 is suitably held by suction from the suction ducts 8, as illustrated in FIG. 18, the peripheral portion of the sucker 19 is brought in contact with the work-piece A airtight, and the sucker 19 is flexed inward with the venting being shut off to constitute a vacuum clearance $a$ between the sucker 19 and work-piece A, thereby submitting the work-piece A to vacuum adhesion on the periphery of the upper face of sucker 19 of the sucker body 17. Thus, the work-piece A is adhered by vacuum on the periphery of the upper face of sucker 19 of the sucker body 17, and machining and cutting can be effected, after said work-piece is firmly fixed to the chuck-board 3 by adhesion.

In this case, liquid is sucked by the pump 23, and the interlocking rod 38 is shifted outwards according to the actuating bar 24, thus releasing the fixing of the piston rod 37 of the liquid-suction apparatus 27, so that the piston 36 may be shifted outwardly by the piston-compressing spring 34 whereby liquid in the vent 6 and suction duct 7 slowly enters the cylindrical hole 35 from the notched seat 32 past the ball valve 30 through the passage 31 and duct 33; during working of work-pieces A, the degree of vacuum is further increased, to strengthen the effect of adhesion by increasing the degree of vacuum in the vacuum clearance ($a$).

Further, the work-piece A fixed by adhesion may be rendered unslidable on account of additional lateral pressure because a filler 40 having a high coefficient of friction is inserted in the grooves 39. Since the discharge grooves 41 are provided on the upper face of the chuck board 3 and suckers 19, which are a little raised from the chuck board 3, are closely secured to the board 3 by adhesion, oil, water or the like are discharged from said grooves 41, when machining, grinding or other working is performed. Furthermore, the chuck board 3 may be formed in rectangular, circular or any other suitable form and simultaneously mounted on a stand which is inclined, rotated or reciprocally moved, depending on the purpose of operation.

Since the present invention has the above mentioned construction, if an airtight annular body 1 is used as shown in FIGS. 1 through 4, the vacuum efficiency will become high, because then the airtightness and elasticity can be obtained by forming the airtight annular body 1 from elastic substance such as rubber, synthetic resin or the like, and simultaneously the machining and grinding can be effected easily on work-piece A which is firmly adhered and fixed to the chuck board 3 by perfectly shutting out the venting of the contact surface which can be held airtight in contact with each other, even when the surface of the work-piece A is uneven to some extent.

Since, as shown in FIGS. 5 through 8, an airtight annular body 9 having annular relief strips 11 on the upper end is used for mounting the work-piece A through the relief strips 11, the airtight annular body 9 can be brought in more airtight contact with the work-piece A to increase the adhesion efficiency.

Since, in such constructions, the central portion of the airtight annular body 1, 9 inserted in the chuck board 3 is opened, and moreover vents 6 is communicated with suction ducts 7, the chuck board 3 will not be closed perfectly and, in consequence, air will enter through vents 6, provided that the work-piece A is especially smaller than the chuck board 3 or has a punched portion, the result will be that vacuum cannot be attained in the suction ducts 7 and, as a result, the work-piece A cannot be fixed by adhesion. Those smaller work-pieces A, particularly smaller than the chuck board or having punched portions can also be firmly fixed by adhesion by using sucker bodies 12 as shown in FIGS. 9 through 13, provided that the work-pieces A are fixed by adhesion on the chuck board 3 for machining grinding and similar other workings for the reason that each individual one of said sucker bodies 12 imparts adhesion to the work-pieces A and as the vents 6 are filled with sucker bodies 12 airtight to shut off venting, the vacuum in suction ducts 7 may be maintained enough to ensure firmly fixing to the work-pieces A, even when the work-pieces A are small or have punched portions, thereby a part of the vents 6 of the chuck board 3 being not closed.

The vacuum can further be enhanced by using sucker bodies 17 and simultaneously filling the vents 6 and suction ducts 7 of the chuck board 3 with liquid, and as a result, the effectiveness of adhesion can be raised. Thus, all sorts of material can be fixed by adhesion to the chuck board 3 for machining, despite whether the work pieces are magnetic or non-magnetic. Moreover, the machining or grinding in rotary or reciprocating movement manner can be performed when the chuck board 3 is secured to a rotary bed or a reciprocating stand. In addition, when the work-pieces A are hung by adhesion, the fixing can be made by one or more sucker bodies 12, 17 put together by a holder mounted on a hanging frame. The construction and operation are also easy and simple.

What is claimed:

1. In a vacuum chuck, the combination comprising a chuck board having a work holding surface and a plurality of surface openings, an annular groove in said work holding surface for each surface opening surrounding the same in concentric relationship, an annular sucker body of elastic material for each surface opening, said sucker body having an annular portion mounted in its corresponding annular groove and having a central flexible portion covering its corresponding opening, said flexible portion having one side facing a workpiece and having an opposite side facing its corresponding opening, passage means in said chuck board communicating with said surface openings, and evacuation means including pump means communicating with said passage means and being operative to flex said flexible portion inwardly into its corresponding opening to create a vacuum between the one side of said flexible portion and the workpiece.

2. The combination as recited in claim 1 wherein said working holding surface is provided with means to resist sliding of the workpiece.

3. The combination as recited in claim 1 wherein said passage means are filled with air and said pump means includes a vacuum pump to evacuate said passage means.

4. The combination as recited in claim 1 wherein said passage means are filled with liquid and said pump means includes a liquid suction device to displace the liquid from said passage means.

References Cited by the Examiner
UNITED STATES PATENTS

| | | | |
|---|---|---|---|
| 1,294,103 | 2/19 | Hitchcock | 269—21 |
| 2,198,765 | 4/40 | Featherstone | 279—3 |
| 2,203,572 | 6/40 | Johnson | 279—3 |
| 2,730,370 | 1/56 | Brewster | 279—3 |
| 2,782,574 | 2/57 | Copold | 51—235 |

ROBERT C. RIORDON, *Primary Examiner.*